(12) United States Patent
Hinger

(10) Patent No.: US 10,095,907 B2
(45) Date of Patent: Oct. 9, 2018

(54) SINGLE TRANSDUCER FINGERPRINT SYSTEM

(71) Applicant: QUALCOMM Incorporated, San Diego, CA (US)

(72) Inventor: Ashish Hinger, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/235,043

(22) Filed: Aug. 11, 2016

(65) Prior Publication Data

US 2018/0046836 A1    Feb. 15, 2018

(51) Int. Cl.
*G06K 9/00* (2006.01)
*G01S 7/52* (2006.01)

(52) U.S. Cl.
CPC ........ *G06K 9/0002* (2013.01); *G01S 7/52079* (2013.01); *G06K 9/0008* (2013.01)

(58) Field of Classification Search
CPC .......................... G06K 9/0002; G06K 9/0008
See application file for complete search history.

(56) References Cited

U.S. PATENT DOCUMENTS

| | | | |
|---|---|---|---|
| 9,323,393 B2 | 4/2016 | Djordjev et al. | |
| 2014/0253435 A1 | 9/2014 | Boser et al. | |
| 2014/0352440 A1 | 12/2014 | Fennell et al. | |
| 2014/0355376 A1* | 12/2014 | Schneider | G01S 7/56 367/7 |
| 2015/0016223 A1* | 1/2015 | Dickinson | G06F 3/043 367/87 |
| 2015/0036065 A1* | 2/2015 | Yousefpor | G06K 9/228 349/12 |
| 2015/0198699 A1 | 7/2015 | Kuo et al. | |
| 2015/0241393 A1 | 8/2015 | Ganti et al. | |
| 2015/0348504 A1 | 12/2015 | Sakariya et al. | |
| 2016/0107194 A1 | 4/2016 | Panchawagh et al. | |

FOREIGN PATENT DOCUMENTS

WO    2005106635 A1    11/2005

OTHER PUBLICATIONS

International Search Report and Written Opinion—PCT/US2017/041734—ISA/EPO—dated Oct. 17, 2017.

* cited by examiner

*Primary Examiner* — Phuoc Tran
(74) *Attorney, Agent, or Firm* — Kilpatrick Townsend & Stockton, LLP

(57) ABSTRACT

Disclosed herein are techniques for generating an image of a target object using a sensor. The sensor includes a substrate and a single transceiver. The transceiver includes a first electrode, a second electrode, and a layer of electrical material positioned between the two electrodes. The transceiver also includes a control unit configured to switch the transceiver into a transmit mode or a receive mode. The transceiver further includes a receiving circuit configured to receive, store, and output a detection signal caused by an interaction between the sensor and the target object. The second electrode, the control unit, and the receiving circuit can be formed on the substrate.

30 Claims, 11 Drawing Sheets

600

SINGLE TRANSDUCER FINGERPRINT SYSTEM

BACKGROUND

Sensors can detect a physical input and, in some instances, convert the physical input to an electrical output. Applications of sensors are widespread and sensors are used in everyday devices, such as mobile devices. Specifically, sensors are gaining popularity for biometric readings, such as for reading fingerprints and for authenticating users.

BRIEF SUMMARY

Techniques disclosed herein relate to generating an image of a target object using a sensor. The sensor may include a substrate and a single transceiver coupled to one side of the substrate. The transceiver may include a first electrode, a second electrode, and a layer of electrical material positioned between the two electrodes. The transceiver may also include a control unit configured to switch the transceiver into a transmit mode or a receive mode. The transceiver may further include a receiving circuit configured to receive, store, and output a detection signal that is generated by the transceiver and caused by an interaction between the sensor and the target object. The second electrode, the control unit, and the receiving circuit may be formed on the substrate. The sensor may include, for example, an ultrasonic sensor, a capacitive sensor, or an optical sensor.

In accordance with an example implementation, a sensor may include a substrate and a transceiver coupled to a first side of the substrate. The transceiver may include a first electrode, a second electrode, and a layer of electrical material positioned between the first electrode and the second electrode. The transceiver may be configured to generate a plurality of transmission signal pulses for transmitting towards the substrate in a transmit mode, in response to receiving a plurality of excitation signal pulses on the first electrode. The plurality of transmission signal pulses, when reflected, may cause a formation of a standing wave signal inside the substrate and the transceiver. The transceiver may also be configured to generate a detection signal via the electrical material in a receive mode, in response to a change in the standing wave signal caused by an interaction between the plurality of transmission signal pulses and a target object. The change in the standing wave signal may include, for example, a change in at least one of an amplitude, a frequency, or a phase of the standing wave signal. In some embodiments, the sensor may further include a cover (e.g., a cover glass or a protective film) coupled to a second side of the substrate opposite to the transceiver.

In various embodiments of the sensor, the plurality of transmission signal pulses may include a plurality of ultrasonic pulses, and the electrical material may include a piezoelectric material. In some embodiments, the piezoelectric material may include at least one of a polyvinylidene difluoride (PVDF) material, a trifluoroethylene PVDF (TrFE-PVDF) material, a piezoelectric micro-machined ultrasonic transducer (PMUT), or a lead zirconate titanate (PZT) material. In some embodiments, the plurality of transmission signal pulses may include a plurality of infrared optical pulses.

In some embodiments, the sensor may also include a control unit configured to switch the transceiver between the transmit mode and the receive mode. The control unit may be configured to connect the second electrode of the transceiver to a bias voltage (e.g., zero volt) in the transmit mode or to a receiving circuit in the receive mode using a switch. In some embodiments, the switch may include one or more n-channel metal-oxide-semiconductor field-effect transistor switches. The receiving circuit may be configured to receive, store, and output the detection signal. In some embodiments, the second electrode, the switch, and the receiving circuit may be formed on the substrate.

In some embodiments of the sensor, the substrate may include a thin-film transistor (TFT) substrate or a silicon substrate. The second electrode may be formed on the TFT substrate or the silicon substrate. In some embodiments, the sensor may also include a plurality of receiver pixels formed on the substrate, where each of the plurality of receiver pixels may be configured to be controlled individually to read out the detection signal generated by the transceiver at each of the plurality of receiver pixels.

In accordance with an example implementation, a method for generating an image of a target object may include applying a plurality of excitation signal pulses to a first electrode of a transceiver in a transmit mode, where the transceiver may also include a second electrode and an electrical material layer positioned between the first electrode and the second electrode. The method may also include generating and transmitting a plurality of transmission signal pulses towards a substrate by the transceiver in response to receiving the plurality of excitation signal pulses, the plurality of transmission signal pulses, when reflected, causing a formation of a standing wave signal inside the substrate and the transceiver. The method may further include generating a detection signal by the electrical material layer of the transceiver in a receive mode in response to a change in the standing wave signal caused by an interaction between the plurality of transmission signal pulses and the target object. In some embodiments, the change in the standing wave signal may include a change in at least one of an amplitude, a frequency, or a phase of the standing wave signal.

In some embodiments, the method for generating an image of a target object may also include connecting the second electrode of the transceiver by a switch to a bias voltage in the transmit mode or to a receiving circuit in the receive mode. In some embodiments, the method may also include reading out the detection signal generated by the transceiver via the receiving circuit, and generating the image of the target object based on the detection signal. In some embodiments, the switch may include one or more n-channel metal-oxide-semiconductor field-effect transistor switches. In various embodiments, the switch, the second electrode, and the receiving circuit may be formed on the substrate.

In some embodiments of the method for generating an image of a target object, the plurality of transmission signal pulses may include a plurality of ultrasonic pulses, and the electrical material layer may include a piezoelectric material. In some embodiments, the substrate may include a thin-film transistor (TFT) substrate or a silicon substrate.

In accordance with another example implementation, an apparatus may be provided, which may include means for applying a plurality of excitation signal pulses to a first electrode of a transceiver in a transmit mode, where the transceiver may also include a second electrode and an electrical material layer positioned between the first electrode and the second electrode. The apparatus may also include means for generating and transmitting a plurality of transmission signal pulses towards a substrate in response to receiving the plurality of excitation signal pulses, where the plurality of transmission signal pulses, when reflected, may cause a formation of a standing wave signal inside the substrate and the transceiver. The apparatus may further include means for generating a detection signal in a receive mode, in response to a change in the standing wave signal caused by an interaction between the plurality of transmission signal pulses and a target object.

In some embodiments, the apparatus may further include means for connecting the second electrode of the transceiver to a bias voltage in the transmit mode or to a receiving circuit in the receive mode. In some embodiments, the apparatus may also include means for reading out the detection signal. In some embodiments, the plurality of transmission signal pulses may include a plurality of ultrasonic pulses, and the electrical material layer may include a piezoelectric material.

In accordance with yet another example implementation, a non-transitory computer-readable storage medium including machine-readable instructions stored thereon is disclosed. The non-transitory computer-readable storage medium may include instructions for causing one or more processing units to connect a first electrode of a transceiver to a bias voltage via a switch in a transmit mode, where the transceiver may also include a second electrode and an electrical material layer positioned between the first electrode and the second electrode. The instructions, when executed by the one or more processing units, may also cause the one or more processing units to apply a plurality of excitation signal pulses to the second electrode of the transceiver in the transmit mode. The transceiver may be configured to generate and transmit a plurality of transmission signal pulses towards a substrate in response to receiving the plurality of excitation signal pulses. The plurality of transmission signal pulses, when reflected, may cause a formation of a standing wave signal inside the substrate and the transceiver. The instructions may also cause the one or more processing units to connect the first electrode of the transceiver to a receiving circuit via the switch in a receive mode, and control the transceiver and the receiving circuit in the receive mode to generate and store a detection signal associated with a change in the standing wave signal caused by an interaction between the plurality of transmission signal pulses and a target object. In some embodiments, the instructions may also cause the one or more processing units to control the receiving circuit to read the stored detection signal, and generate an image of the target object based on the detection signal.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1A:
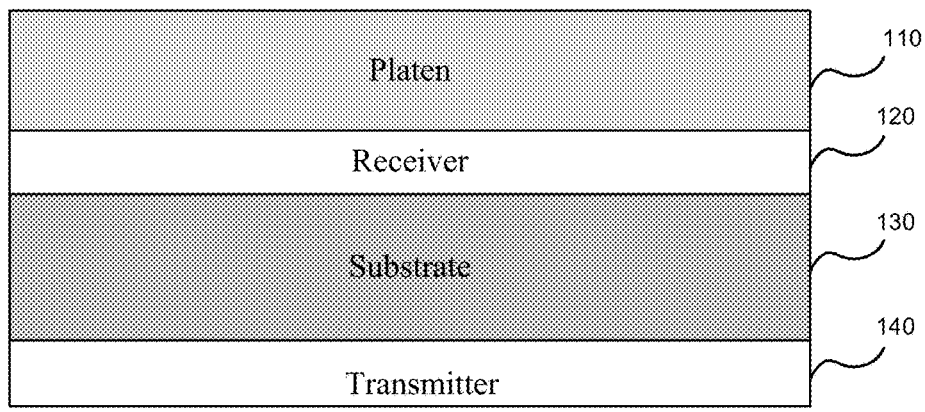
FIG. 1A illustrates a simplified cross-sectional view of an example ultrasonic sensor.

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques disclosed herein relate to a fingerprint sensor using a single transducer in a single transceiver, rather than using a separate transmitter and a separate receiver, each having its own transducer. The use of a single transceiver to construct an imaging system may increase the overall efficiency of the sensor, while improving yield and reducing the cost of manufacturing and power consumption. In this disclosure, ultrasonic sensors are used as examples and are described in various embodiments. However, a skilled person in the art would understand that the single transceiver design can be used in ultrasonic, capacitive, infrared, and other sensors.

As used herein, a transducer may be referred to as a device that converts one form of energy to another, such as from an electric signal to an acoustic signal, from an electrical signal to an optical signal, from an acoustic signal to an electrical signal, or from a pressure to an electrical signal, etc. A transceiver may be referred to as a device comprising both a transmitter and a receiver that are combined and share common circuitry. A transmitter, a receiver, or a transceiver may include one or more transducers and associated terminals, such as electrodes, for applying or receiving the corresponding signals.

When wave signals, for example, acoustic signals such as ultrasonic signals, travel through a medium (i.e., traveling waves), they may be observed as waves with crests followed by troughs over a period of time. However, when the ultrasonic signals are incident on a mismatched boundary, the ultrasonic signals may be partially transmitted into the adjacent medium and partially reflected backwards, where the amount of reflection is a function of the materials on the two sides of the boundary. For example, if a wave signal is traveling through a substantially solid medium and the adjacent medium is air, most of the wave signal may be reflected back into the solid medium due to the high level of impedance mismatch. On the other hand, when a wave signal is traveling through a first medium and the adjacent second medium is a medium having similar characteristics as the first medium, most of the wave signal may be transmitted into the second medium due to the close match. In any case, the reflected portion of the wave signal may interfere with consecutively generated wave signals in a given medium (or plurality of mediums) within a sensor stack and produce an accumulated wave that may amplify over time, by the constructive interference of the plurality of signals over time. The amplitude of the accumulated wave may therefore indicate the property of the adjacent medium.

As used herein, an excitation signal pulse in an ultrasonic sensor may refer to an electrical signal applied to an ultrasonic transmitter for generating ultrasonic wave signals within an ultrasonic sensor. Each excitation signal pulse may correspond to an ultrasonic wave signal generated within the sensor. The ultrasonic wave signals may have an associated wavelength and frequency within each medium or layer of the sensor stack and may be generated by applying excitation signal pulses to one or more transmitter electrodes using, for example, an external power source or a transmitter excitation signal pulse generator circuit, also known as a tone-burst generator. One or more electrical excitation signal pulses may be applied in succession to the ultrasonic transmitter. The frequency of the applied excitation signal pulses may result in a buildup of the energy and the amplitude of an ultrasonic standing wave developed, formed or otherwise generated within the ultrasonic sensor. The frequency of the applied excitation signal pulses may be inversely related to the time interval between the start of a first excitation signal pulse (or cycle) and a corresponding portion of a second excitation signal pulse (or cycle). In some implementations, the frequency of the applied excitation signal pulses may be inversely related to the time period (e.g., total time duration in seconds) for each pulse. In various embodiments, the excitation signal pulse may be referred to as an electrical excitation signal pulse, tone burst, cycle or merely signal, which may be used interchangeably in this disclosure without deviating from the scope of the invention.

With proper selection of the excitation frequency and waveform for a given set of materials and thicknesses, the transmitted signal (e.g., generated ultrasonic wave signal) and the reflected signal may interact in such a manner so as to constructively overlap with each other as they bounce between the boundaries of the medium, causing the ultrasonic wave to appear standing, which may be referred to as a standing wave, standing wave signal or ultrasonic standing wave signal. Furthermore, with continued generation and application of the excitation signal pulses, the constructive transmitted and reflected signals may continue to add up in amplitude until an equilibrium value is approached or until the excitation signal pulses are decreased in amplitude or are removed altogether (e.g., stopped or no longer applied).

Thus, the proper selection of the material, thickness, and density of the various mediums or layers in the sensor stack may result in the formation of an acoustic cavity that exhibits resonance or resonant behavior for forming the standing wave signal at a particular frequency. An acoustic cavity may also be referred to as an acoustic resonant cavity, a resonant acoustic cavity, a resonant cavity, an acoustic resonator or a cavity resonator, interchangeably with each other without deviating from the scope of the invention. An acoustic resonant cavity may have more than one resonant frequency, and operations at a low or fundamental resonant frequency may be less desirable than operations at or near a higher resonant frequency. For example, enhancements to the image resolution and quality may be achieved when the acoustic resonant cavity is operating at a higher frequency, due in part to the shorter acoustic wavelength in the sensor unit with higher operating frequencies.

FIG. 1A illustrates a simplified cross-sectional view of an example ultrasonic sensor 100. Ultrasonic sensor 100 may include an ultrasonic transmitter (Tx) 140, an ultrasonic receiver (Rx) 120, a substrate layer 130, such as a thin-film transistor (TFT) layer, positioned between transmitter 140 and receiver 120, and a cover (platen) layer 110 disposed on top of receiver 120. Substrate layer 130 may include receiver pixel circuits of receiver 120 formed thereon, such as TFT pixel circuits, for detecting standing waves at different locations (pixels) of ultrasonic sensor 100.

Figure 1B:
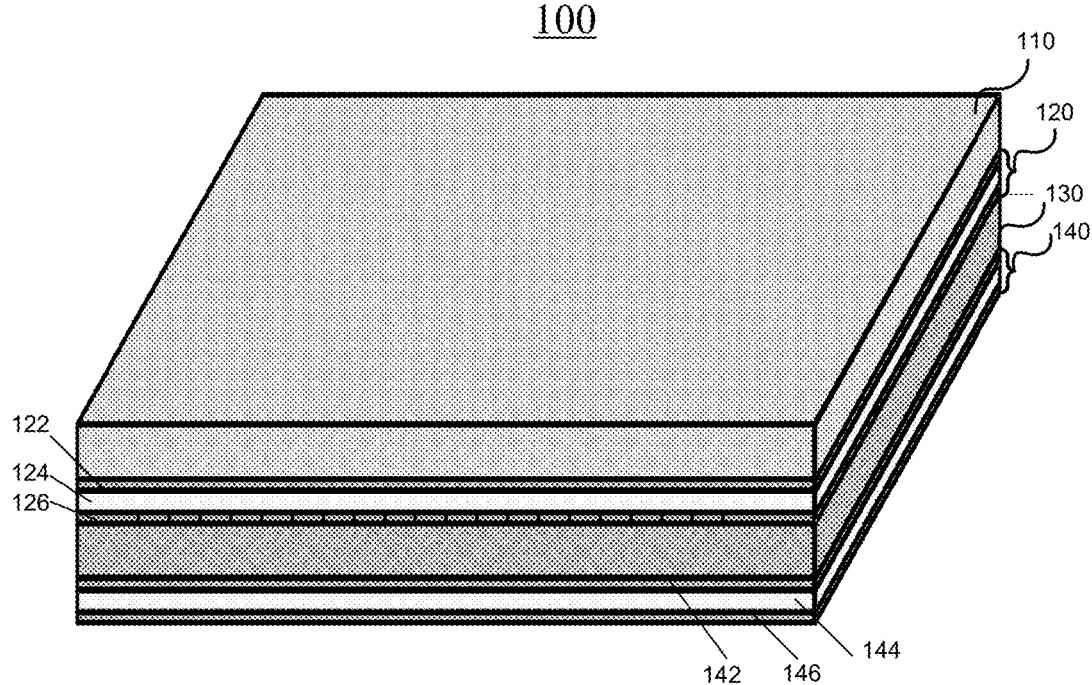
FIG. 1B illustrates an assembled view of an example ultrasonic sensor.

FIG. 1B illustrates an assembled view of example ultrasonic sensor 100 including cover layer 110, receiver 120, substrate layer 130 with TFT pixel circuitry for receiver 120, and transmitter 140. Transmitter 140 may include transmitter excitation electrodes 142 and 146 and one or more electrical material (e.g., piezoelectric) layers 144 disposed between transmitter excitation electrodes 142 and 146. Excitation signals may be applied on transmitter excitation electrodes 142 and 146 to apply electrical voltages on electrical material (e.g., piezoelectric) layers 144 such that vibrations generating ultrasonic signals may be produced. Transmitter excitation electrodes 142 and 146 may be configured to allow single-ended or doubled-ended drive schemes and self-shielding by grounding one or more of the transmitter excitation electrodes. Receiver 120 may include a receiver bias electrode 122, one or more electrical material layers 124, and a receiver pixel circuit layer 126 formed on substrate layer 130.

Figure 1C:
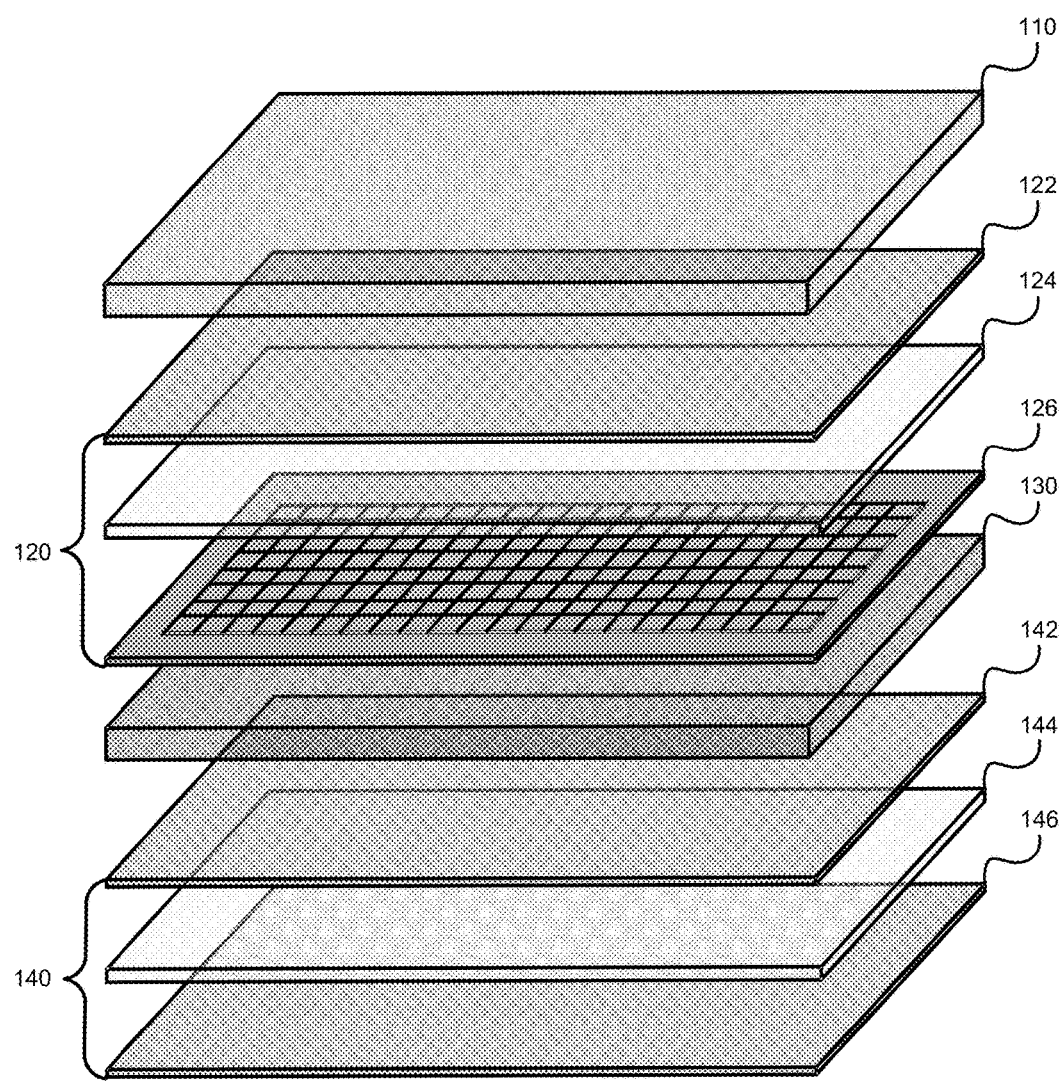
FIG. 1C illustrates an exploded view displaying various layers of a material stack for an example ultrasonic sensor.

FIG. 1C illustrates an exploded view displaying various layers of a material stack of example ultrasonic sensor 100. FIG. 1C shows, top to bottom, cover layer 110, receiver 120 including receiver bias electrode 122, electrical material layers 124, and receiver pixel circuit layer 126, substrate layer 130, and transmitter 140 including transmitter excitation electrode 142, one or more electrical material layers 144, and transmitter excitation electrode 146.

Cover layer 110 may be a cover glass or protective film (e.g., glass, polycarbonate, acrylic, parylene or any other appropriate material serving as a cover or coating). Cover layer 110 may include a parylene coating, a urethane coating, an acrylic coating, a hard coat such as a diamond-like coating (DLC), or other suitable coating. Receiver bias electrode 122 may include, for example, silver-urethane, nickel/copper (Ni/Cu), or indium tin oxide (ITO). Electrical material layer 124 or 144 may include a piezoelectric receiver layer, such as a polyvinylidene difluoride (PVDF) or trifluoroethylene PVDF (TrFE-PVDF) copolymer layer. Receiver pixel circuit layer 126 may include pixel circuitry formed on substrate layer 130, such as a TFT substrate (e.g., glass or plastic). Transmitter excitation electrodes 142 and 146 may include, for example, silver-urethane or Ni/Cu disposed on piezoelectric material (e.g., PVDF or TrFE-PVDF). Various adhesive layers and optional coating layers have been omitted from the illustration of FIG. 1C for clarity. Furthermore, in addition to the layers shown in FIG. 1C, other layers may also be implemented without departing from the scope of the invention.

In one example, transmitter 140 may include an electrically conductive layer of silver and polyurethane (Ag-Ur) on a layer of piezoelectric material such as PVDF and a second layer of silver-urethane (Ag-Ur) on an opposing surface of the PVDF layer, with example thicknesses of 9 um, 28 um and 9 um, respectively. Substrate layer 130 may be implemented using glass or plastic TFT substrate and may have a thickness of about 500 um. Receiver pixel circuit layer 126 may be formed on the TFT substrate using, for example, a low-temperature polysilicon, amorphous silicon, or other insulated-gate thin-film transistor process. Receiver 120 may include a piezoelectric layer of PVDF covered with a silver-urethane layer having a thickness of about 28 um and 9 um, respectively. The total thickness of the acoustic cavity may be the sum of the thickness of each layer of the ultrasonic sensor.

In FIGS. 1A-1C, an acoustic cavity may be formed by transmitter 140, substrate layer 130, and receiver 120. Another acoustic cavity may be formed by receiver 120, cover layer 110, and air above cover layer 110. Some parameters for the acoustic cavity may include the thickness of various layers and the speed of sound within the various layers that form the acoustic cavity. The speed of sound depends in part on the mass density and elastic moduli of the incorporated materials. The thickness of the acoustic cavity may depend on or at least correlate to the thickness of the TFT substrate, piezoelectric layers, electrodes and adhesives (e.g., epoxy or pressure sensitive adhesive (PSA)), and any cover layers, backing layers, or coatings. The effective density of the acoustic cavity may depend on or at least correlate to the density of the substrate material, piezoelectric materials, electrode and adhesive materials, and any cover or coating materials. Similarly, the effective speed of sound in the acoustic cavity may depend on the choice of substrates, piezoelectric materials, electrode materials, adhesives, and any cover or coating materials.

Figure 2:
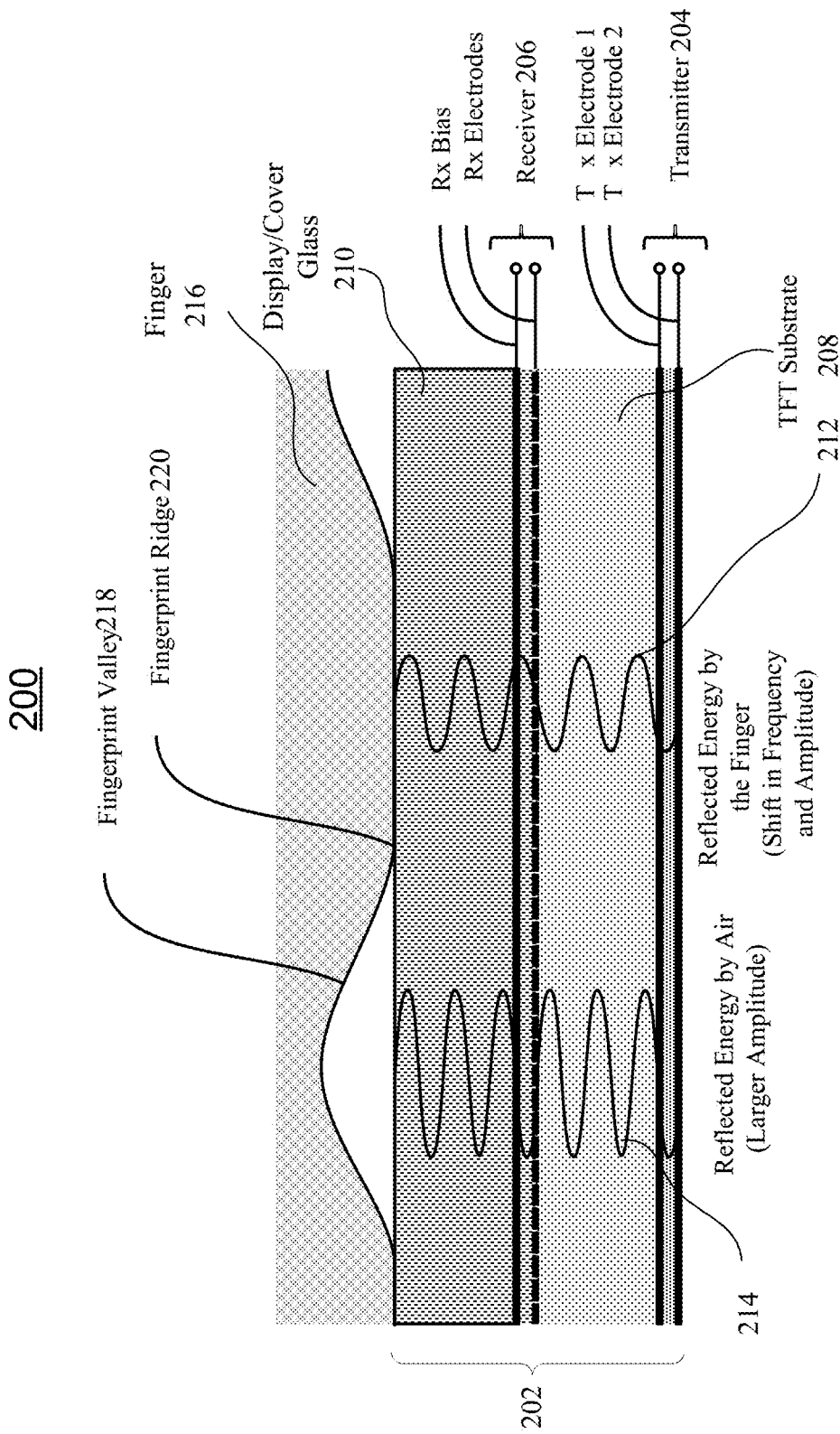
FIG. 2 illustrates a cross-sectional view of an example ultrasonic sensor.

FIG. 2 illustrates a cross-sectional view 200 of an example ultrasonic sensor 202. As shown in FIG. 2, standing wave signals may be generated in ultrasonic sensor 202. The touching of an object such as a finger 216 on a surface of ultrasonic sensor 202 may change characteristics of the standing wave signal such as amplitude or phase at the receiver 206, allowing for the detection of the ridges and valleys of the fingerprint and the acquisition of an image such as a fingerprint or other biometric information with a TFT pixel array having sufficient resolution.

As shown in FIG. 2, ultrasonic sensor 202 in one configuration may include an ultrasonic transmitter (Tx) 204, a receiver (Rx) 206, a TFT substrate 208 positioned between the transmitter 204 and the receiver 206, and a platen or display/cover glass 210 disposed over the receiver. Adhesive attachment layers and one or more coating layers may be included (not shown for clarity). To apply the excitation signal pulses and generate the ultrasonic wave signals, transmitter 204 may have one or more electrodes on each side of a piezoelectric transmitter layer to apply the potential difference for driving transmitter 204. Similarly, receiver 206 may have a receiver bias (Rx Bias) electrode on one side of a piezoelectric receiver layer and a plurality of pixel input electrodes (Rx Electrodes) coupled to the pixel circuitry formed on TFT substrate 208. The pixel circuitry may be configured to detect a change in one or more characteristics of the standing wave signal in the acoustic cavity at different locations of the ultrasonic sensor.

FIG. 2 also illustrates changes in one or more characteristics of the ultrasonic standing wave signal associated with the interaction between the standing wave signal in the acoustic cavity of ultrasonic sensor 202 and the target object, such as the fingers of a user. Detecting the change in the one or more characteristics of the signal may include detecting the change in the amplitude, frequency, or phase of the signal. In FIG. 2, the difference in the acoustic energy reflected by air and the acoustic energy reflected by a finger may result in differences in the characteristics of the standing wave signal. For example, as shown in FIG. 2, an air gap formed by fingerprint valley 218 may only minimally change the amplitude and/or phase of standing wave signal 214. On the other hand, touching of a fingerprint ridge 220 against an exposed portion of the sensor (e.g., sensor surface) may dampen the energy of the standing wave signal and may cause a shift in the frequency, amplitude and/or phase of standing wave signal 212 as shown in FIG. 2. The pixel circuitry may then detect the change in the one or more characteristics of the standing wave signals in the acoustic cavity at different locations of the ultrasonic sensor to generate a fingerprint image.

As can be seen in FIGS. 1A-1C and 2, the example ultrasonic sensor, such as ultrasonic sensor 100 or 202, includes multiple transducers, cavities and electrodes. The use of more electronic components may increase the cost and reduce the yield during the design and manufacturing of the ultrasonic sensors. Furthermore, the size, driving current (and thus power consumption), and signal-to-noise ratio (sensitivity) of the ultrasonic sensor may be limited by the structure of the ultrasonic sensor. For example, the resonant cavity formed in the cover glass and the cavity formed in the TFT substrate may compete with each other to get the maximum energy into or out of the sensor, and thus may affect the efficiency and the sensitivity of the sensor.

Figure 3:
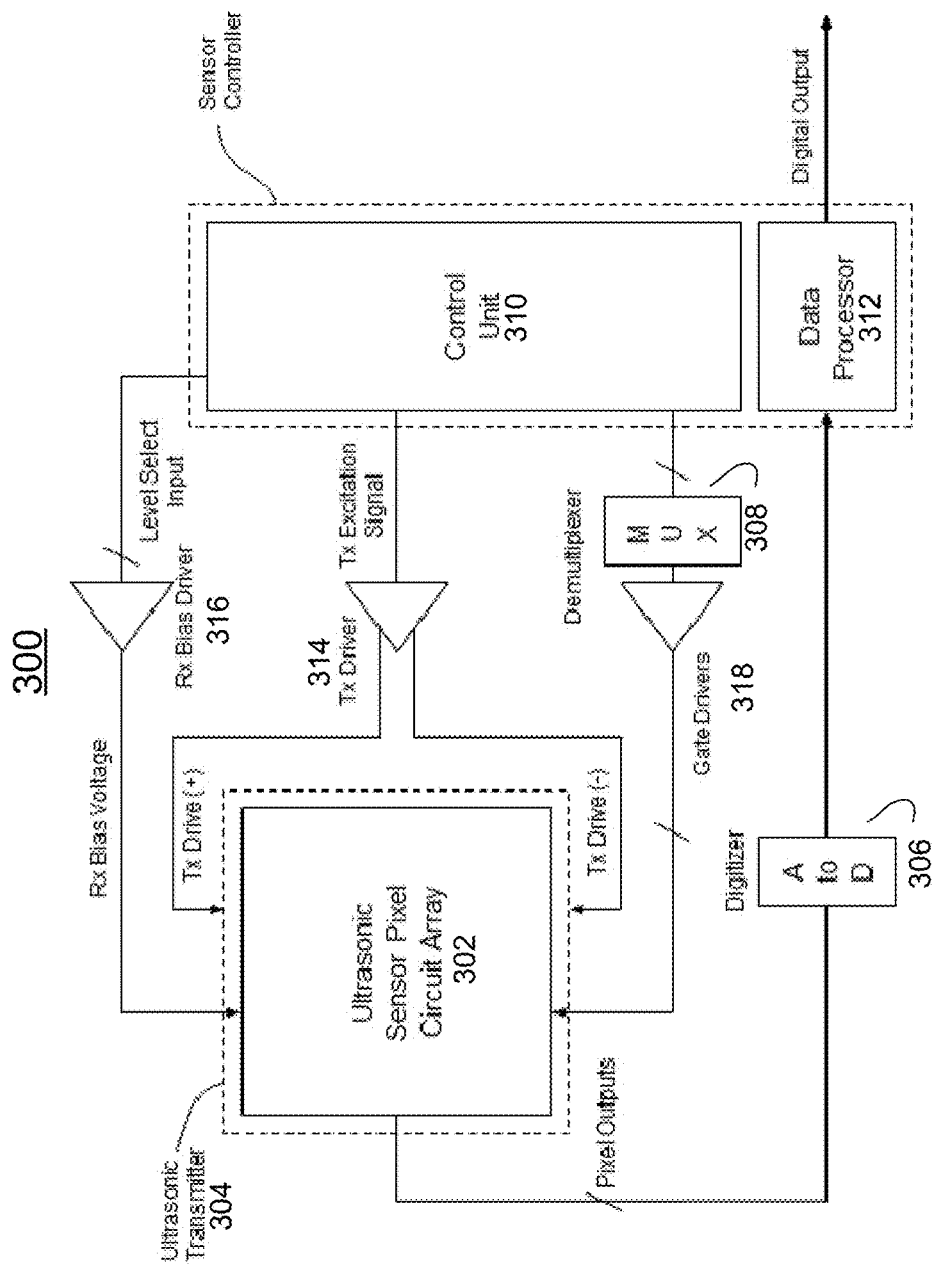
FIG. 3 illustrates a block diagram for an example representation of an ultrasonic sensor.

FIG. 3 illustrates a block diagram for an example representation of an ultrasonic sensor 300, such as an ultrasonic fingerprint sensor. Ultrasonic sensor 300 may include a TFT substrate that has an ultrasonic transmitter 304 and a receiver coupled to an ultrasonic pixel circuit array 302. Ultrasonic pixel circuit array 302 and an overlying piezoelectric receiver layer act as the receiver. Ultrasonic pixel circuit array 302 may be disposed on the TFT substrate. Ultrasonic sensor 300 may include a control unit 310 for controlling the operation of ultrasonic pixel circuit array 302 and ultrasonic transmitter 304. Control unit 310 may control the operation of ultrasonic transmitter 304 by sending excitation signals to ultrasonic transmitter 304 through transmitter driver 314, such as a tone-burst generator. Control unit 310 may control the operation of ultrasonic pixel circuit array 302 by applying bias voltages to ultrasonic pixel circuit array 302 through a bias driver 316, and selecting the appropriate pixel output signals (e.g., rows or columns) using one or more demultiplexers 308 and associated gate drivers 318. The outputs from the selected pixels of ultrasonic pixel circuit array 302 may be digitized by an analog-to-digital converter (ADC) 306, and sent to data processor 312 for processing. Data processor 312 or other processors may analyze the data read out from each pixel of ultrasonic pixel circuit array 302 to generate the fingerprint image.

In some examples, control unit 310 and/or data processor 312 may be implemented using processing unit 1210 described in FIG. 12 below. In some examples, control unit 310 and data processor 312 may be implemented using an application specific integrated circuit (ASIC) or a field programmable gate array (FPGA). In some implementations, control unit 310 and/or data processor 312 may be used to obtain sensor output signals from ultrasonic pixel circuit array 302, and generate the image from the sensor output signals.

Even though thin-film transistors formed on glass or plastic TFT substrates may be described in the examples above, in alternative forms, a silicon substrate with transistors formed thereon or therein may be substituted without limitation for the TFT substrates throughout this disclosure.

Figure 4:
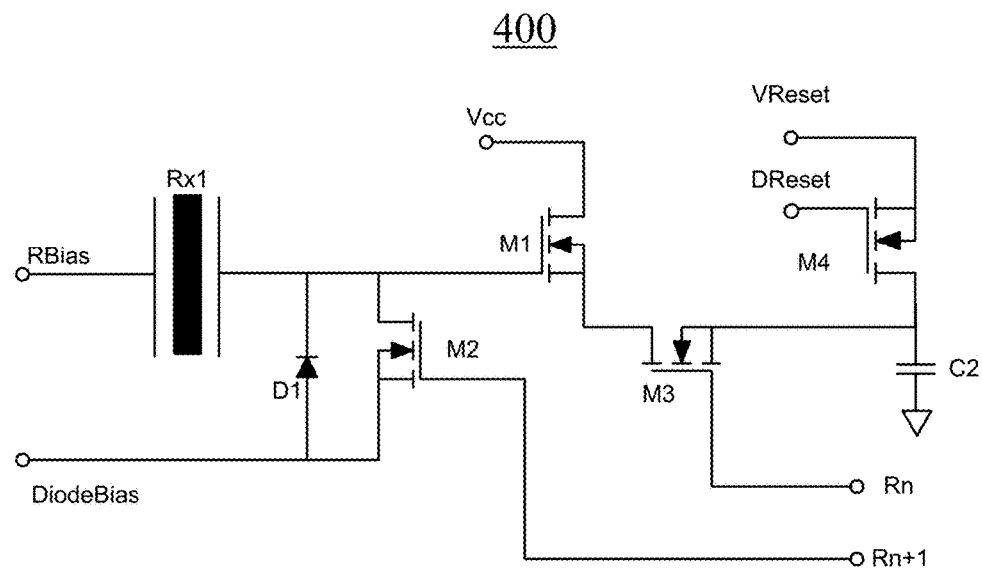
FIG. 4 illustrates an example circuit of a receiver pixel in an ultrasonic sensor.

FIG. 4 illustrates an example circuit 400 of a receiver pixel in an ultrasonic sensor, such as a pixel in ultrasonic pixel circuit array 302. Circuit 400 includes a receiver RX1, a diode D1, and four transistors M1-M4, such as n-channel metal-oxide-semiconductor (NMOS) or p-channel metal-oxide-semiconductor (PMOS) field effector transistors (FETs). One electrode of receiver RX1 may be driven by an RBias signal, which may selectively allow reflected ultrasonic wave to reach the receiver pixel. The other electrode of receiver RX1 may be connected to the gate of transistor M1.

In the initial state, no pixel read signal ($R_n$ or $R_{n+1}$) is applied and transistors M2 and M3 are in OFF state. The gate of transistor M1 is set to a potential level close to the potential level of the DiodeBias signal. When a transmitter excitation signal occurs, RBias may selectively block or allow the reflected ultrasonic wave to reach the receiver pixel.

Figure 5:
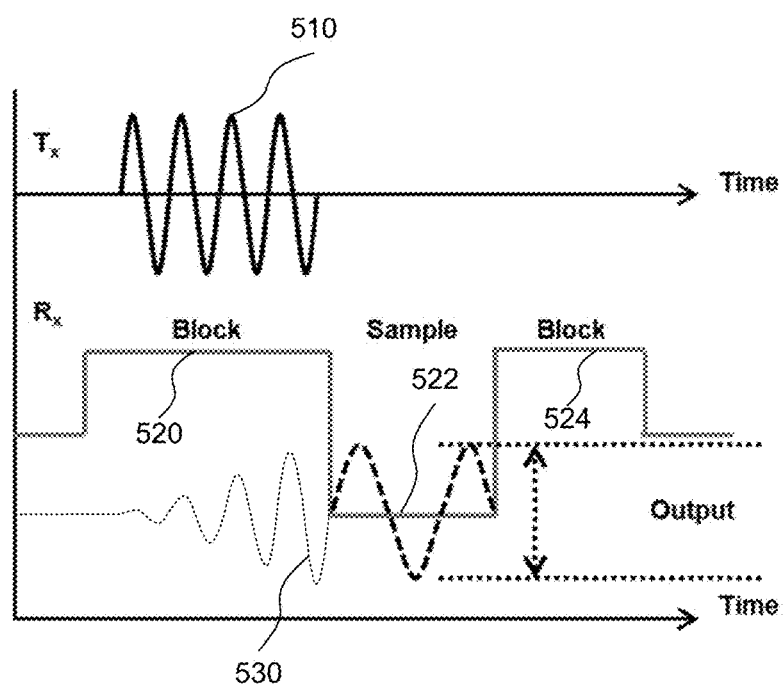
FIG. 5 illustrates an example operation of an ultrasonic sensor circuit.

FIG. 5 illustrates an example operation of an ultrasonic sensor including a receiver RX1. Receiver RX1 may be controlled by an RBias signal that selectively allows the reflected ultrasonic wave to reach the receiver pixel. As shown in FIG. 5, bursts or cycles of transmitter excitation signal pulses 510 are applied to a transmitter. The reflected ultrasonic wave builds up within the ultrasonic sensor during a block period 520, forming a standing wave signal 530 with a time-varying amplitude. The generated standing wave signal may be sampled by receiver RX1 during sample period 522 as shown in FIG. 5. After sample period 522, the reflected ultrasonic wave may be blocked from reaching the receiver pixel again during a second block period 524.

During the sample period, the ultrasonic standing wave signal may be peak detected by diode D1, and charges may be stored on the gate of transistor M1 due to the parasitic capacitor of the gate of transistor M1. The amount of charges stored on the gate of transistor M1 may depend on the capacitance of receiver RX1 and the voltage generated by the piezoelectric material caused by the standing wave signal within the piezoelectric material.

During the second block period, the pixel voltage on the gate of transistor M1 may be read back by turning on transistor M3 using a pixel read signal Rn for selecting the pixel. Transistor M1 may be configured as a source follower transistor, i.e., a common-drain amplifier, and therefore the resulting voltage at the source of transistor M1 or M3 may be approximately equal to the pixel voltage on the gate of transistor M1 minus a gate threshold voltage. The read out signal may be held on capacitor C2, which may be a parasitic capacitor at the output node, and converted to a digital signal by an ADC as described above with respect to FIG. 3. When the reading of the pixel completes, transistor M2 may be turned on via Rn+1 to reset the gate of transistor M1 to the DiodeBias voltage, and transistor M4 may be activated through DReset signal to reset the voltage on C2 to a known level VReset.

As described above with respect to FIGS. 1A-1C, ultrasonic sensor 100 includes multiple transducers, cavities and electrodes, which may increase the cost and reduce the yield during the design and manufacturing of the ultrasonic sensors. The resonant cavity formed in the cover glass and the cavity formed in the TFT substrate may compete with each other to get the maximum energy into or out of the sensor. The size, driving current (and thus power consumption), and signal-to-noise ratio (sensitivity) of the ultrasonic sensor may be limited by the structure of the ultrasonic sensor. A single transducer in a single transceiver may be used to replace the multiple transducers in a separate transmitter and receiver to improve the overall efficiency and reduce cost and power consumption of the ultrasonic sensor, while using substantially similar control circuit and pixel circuits as shown in FIGS. 3 and 4.

Figure 6A:
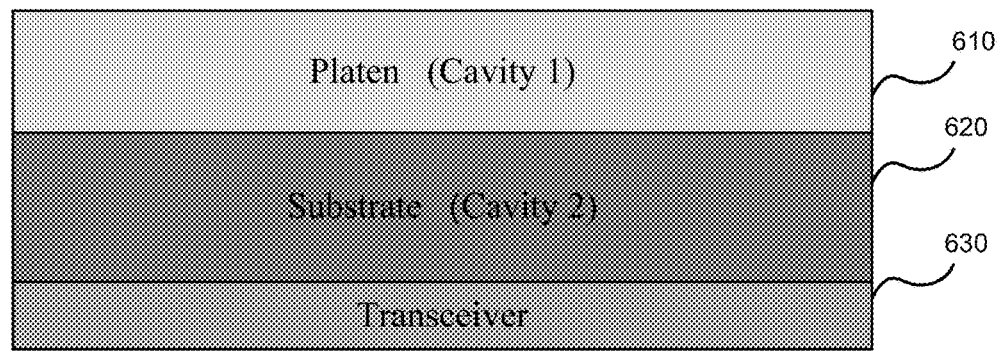
FIG. 6A illustrates a simplified cross-sectional view of an example ultrasonic sensor having a single transceiver.

FIG. 6A illustrates a simplified cross-sectional view of an example ultrasonic sensor 600 having a single transceiver, where transmitter 140 and receiver 120 of FIGS. 1A-1C are combined into a single transceiver 630. Ultrasonic sensor 600 may include a substrate layer 620 on which receiver pixel circuits may be fabricated. Substrate layer 620 may include a TFT substrate, a silicon substrate, etc. In some embodiments, ultrasonic sensor 600 may include a cover (platen) layer 610 as described above with respect to cover layer 110 of FIGS. 1A-1C and display/cover glass 210 of FIG. 2. Cover layer 610 may include any suitable material of any suitable thickness for protecting the sensor.

Figure 6B:
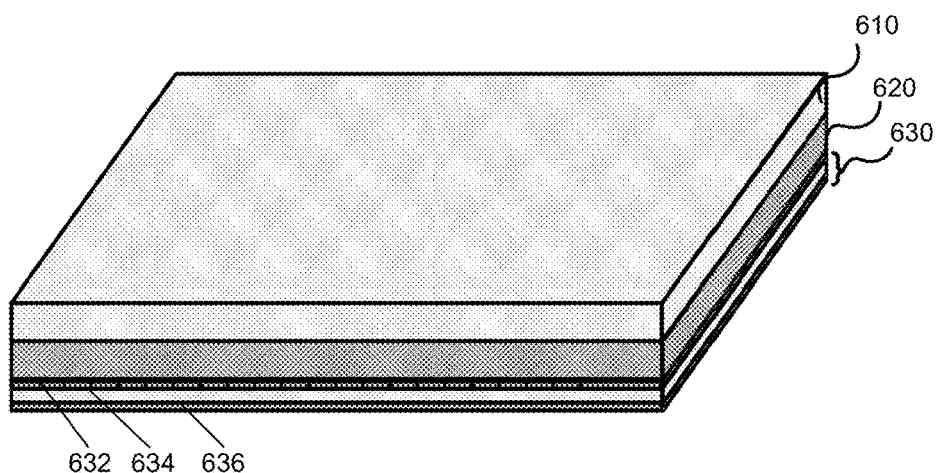
FIG. 6B illustrates an assembled view of an example ultrasonic sensor having a single transceiver.
Figure 6C:
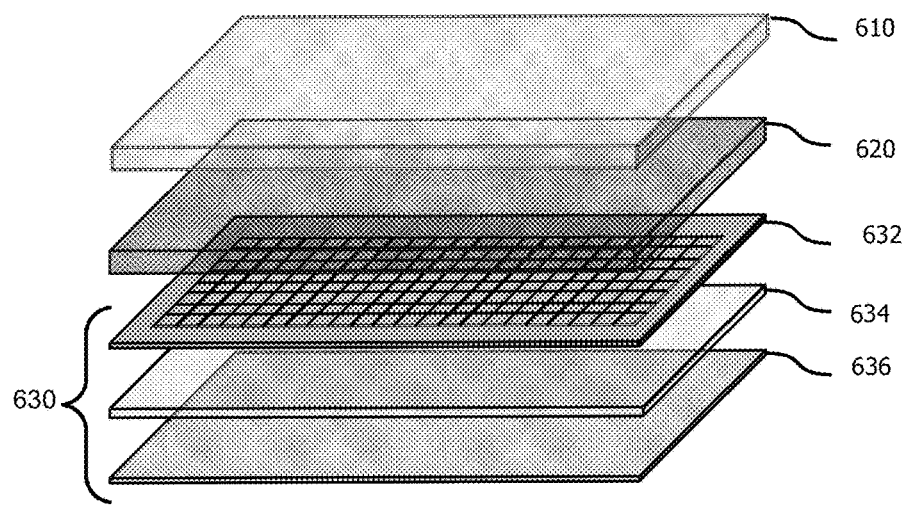
FIG. 6C illustrates an exploded view displaying various layers of a material stack for an example ultrasonic sensor having a single transceiver.

FIG. 6B illustrates an assembled view of example ultrasonic sensor 600 having a single transceiver. FIG. 6C illustrates an exploded view displaying various layers of a material stack for example ultrasonic sensor 600 shown in FIGS. 6A and 6B. In FIGS. 6A-6C, transceiver 630 may include a piezoelectric material layer 634 positioned between two circuit layers 632 and 636. Piezoelectric material layer 634 may include, for example, PVDF, TrFE-PVDF, a piezoelectric micro-machined ultrasonic transducer (PMUT), or lead zirconate titanate (PZT). Circuit layers 632 and 636 may be shared by the transmitter portion and the receiver portion of transceiver 630 of ultrasonic sensor 600. In some implementations, circuit layer 632 may be formed on one side of substrate layer 620 and may include a receiving circuit comprising a plurality of receiver pixels. Each pixel of the plurality of receiver pixels may be individually addressable and controllable. Circuit layer 636 may include a silver-urethane or Ni/Cu film disposed on piezoelectric material layer 634, and act as an electrode for transceiver 630.

It is noted that even though FIGS. 6A-6C describe one specific implementation of an ultrasonic sensor using a single transceiver, a person skilled in the art would understand that an ultrasonic sensor having a single transceiver may be implemented in various ways. For example, in some implementations, cover layer 610 may be optional. In some implementations, transceiver 630 may be disposed between cover layer 610 and substrate layer 620. In some implementations, cover layer 610 may be disposed underneath transceiver 630 shown in FIGS. 6A-6C, and fingerprints may be read from either side of the ultrasonic sensor.

Since an integrated single transceiver is used in ultrasonic sensor 600 instead of a separate transmitter and a separate receiver, a better acoustic stack may be created because cavity 1 and cavity 2 can be synchronized, which results in maximum energy into or out of the platen (cover glass). Thus, a higher signal-to-noise ratio (SNR) and a better image quality, low false acceptance rate (FAR) and false recognition rate (FRR), and improved receiver operating characteristics (ROCs) of the fingerprint system can be achieved. Due to the single transceiver and optimal cavity design, higher transmission frequency operation can be achieved, resulting in improved lateral (x-y plane) and axial resolution of the system. A sensor system with an improved 3D resolution allows the detection of higher spatial frequency features and improves fingerprint quality for users with shallow ridge-valley.

Compared with example ultrasonic sensor 100 shown in FIGS. 1A-1C, ultrasonic sensor 600 in FIGS. 6A-6C uses fewer layers and materials in the stack, and thus the manufacturing process can be simplified, the yield of the manufacturing can be improved, and the cost of the sensor can be reduced. Furthermore, with only one transducer in the system, the driving condition and the electronic circuitry can be optimized, which may result in reduced power consumption. For example, rather than using four electrodes as in FIGS. 1A-1C and 2 (2 for the transmitter and 2 for the receiver), ultrasonic sensor 600 of FIGS. 6A-6C uses two electrodes shared by the transmitter portion and the receiver portion of transceiver 630; thus the circuitry and the control operation associated with the transceiver can be simplified and optimized.

When using an ultrasonic sensor having a single transducer system for imaging especially for ultrasound application, a high voltage high frequency switch may be used to switch between the transmit mode and the receive mode. The high voltage high frequency switch may consume high current as it is driven at high voltages and high frequencies (in the ranges of hundreds of MHz). Circuits such as the one shown in FIG. 7 and FIG. 9 below may be used to replace the high voltage high switch for handling the high speed switching.

Figure 7:
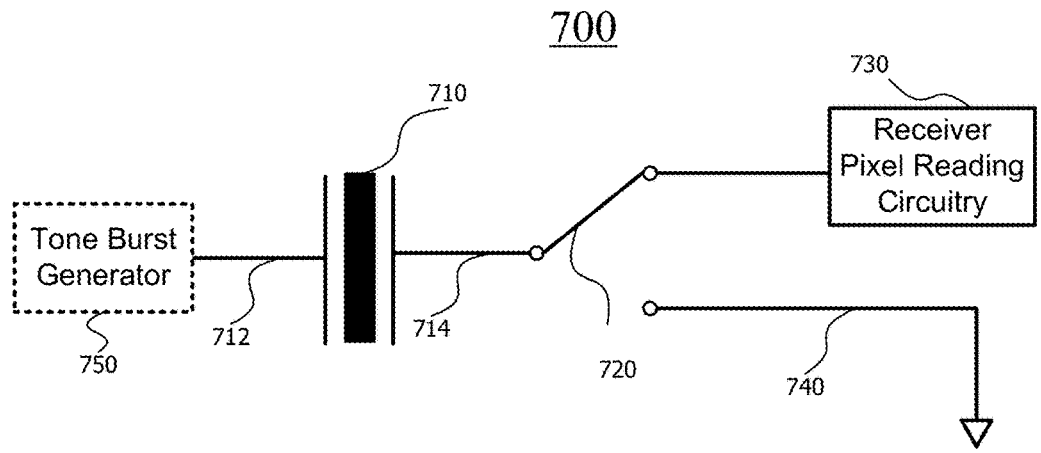
FIG. 7 illustrates an example of a simplified pixel circuitry of an ultrasonic sensor.

FIG. 7 illustrates an example of a simplified pixel circuit 700 of an ultrasonic sensor. As shown in FIG. 7, a first electrode of transceiver 710 (excitation electrode 712, e.g., circuit layer 636 of FIG. 6) is connected to a tone-burst generator 750 (internal or external to pixel circuit 700) for applying excitation signal pulses to the transducer of transceiver 710 for generating the transmission ultrasonic pulses. A second electrode 714 of transceiver 710 (e.g., on circuit layer 632 of FIG. 6) may be connected to a switch 720. Switch 720 may connect second electrode 714 to either a terminal 740 connected to a constant bias voltage, such as the ground (or other DC bias level), in the transmit mode, or to receiver pixel reading circuitry 730 in the receive mode. Switch 720 may include one or more high speed n-channel metal-oxide-semiconductor field-effect transistor (n-channel MOSFET or NMOS) transistor switches. In this way, during the transmit mode, the excitation signal pulses are applied on excitation electrode 712 and a DC bias is applied on second electrode 714. During the receive mode, electrical signals generated by the transducer of transceiver 710 may be read back through receiver pixel reading circuitry 730.

Figure 8:
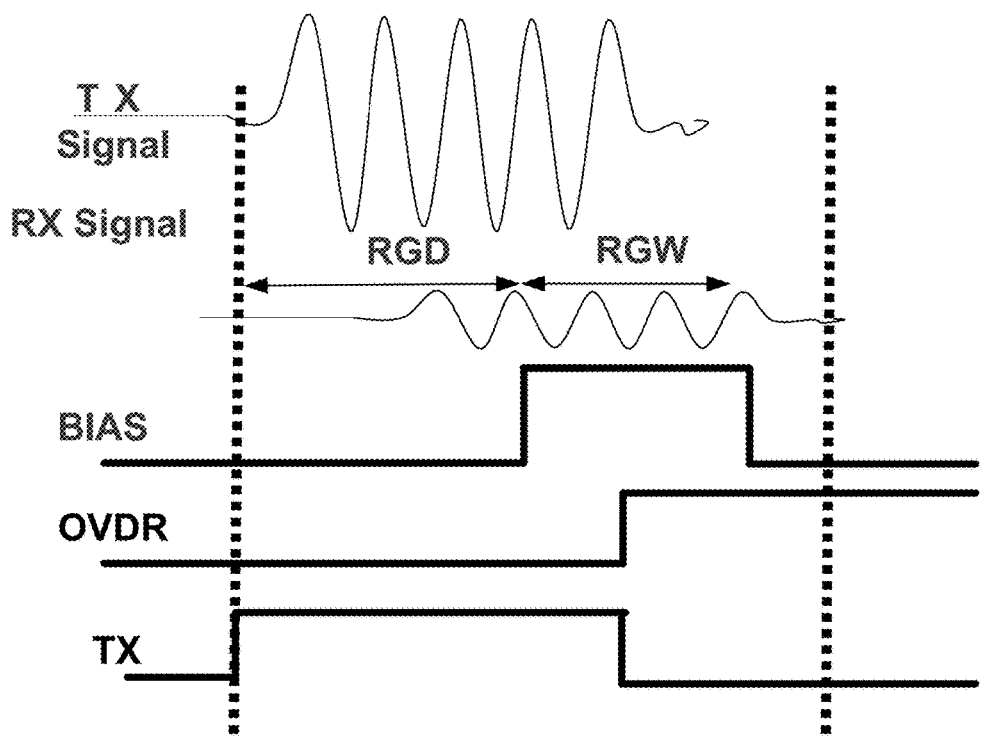
FIG. 8 illustrates a simplified timing diagram for switching between a transmit mode and a receive mode in an ultrasonic sensor.

FIG. 8 illustrates a simplified timing diagram for switching between a transmit mode and a receive mode in an ultrasonic sensor. In the transmit mode (TX is high), the tone-burst generator (e.g., tone-burst generator 750 in FIG. 7) is enabled, excitation signal pulses (tone bursts) are applied on the excitation electrode (e.g., excitation electrode 712) of the transceiver (e.g., transceiver 710). The other electrode (e.g., second electrode 714) of the transceiver may be grounded through switch 720 controlled by the overdrive (OVDR) signal when the OVDR signal is low. Thus, a transmission signal as shown by TX signal in FIG. 8 may be applied across the transducer of the transceiver, which may generate an ultrasonic output signal due to the stimulation of the transmission signal. The ultrasonic output signal is then transmitted to the substrate and/or the platen of the ultrasonic sensor, and is reflected at the interfaces between different mediums, for example, at the interface between the platen and air. As described above, the ultrasonic output signal and the reflected ultrasonic signal may constructively interfere with each other to form a standing wave.

After a range gate delay (RGD), i.e., the time delay between the start of the excitation signal pulses and the opening of the sample window, a Bias signal on a diode (such as DiodeBias on Diode D1 in FIG. 4) in the pixel circuitry (e.g., pixel circuit 700) goes high and the ultrasonic signal is peak detected by the diode and stored on, for example, the gate of transistor M1 of FIG. 4, during the range gate width (RGW) period, as described above with respect to FIGS. 4 and 5. During the RGW period, the tone-burst generator is disabled when TX is low, and a constant voltage rather than tone bursts may be applied on the excitation electrode of the transceiver. When the OVDR signal goes high, the transceiver may be connected to a pixel reading circuit (e.g., receiver pixel reading circuitry 730) through switch 720 controlled by the OVDR signal. The voltage of the signal stored at, for example, the gate of transistor M1 in FIG. 4, may then be read out by the pixel reading circuit as described above with respect to FIGS. 4 and 5.

Figure 9:
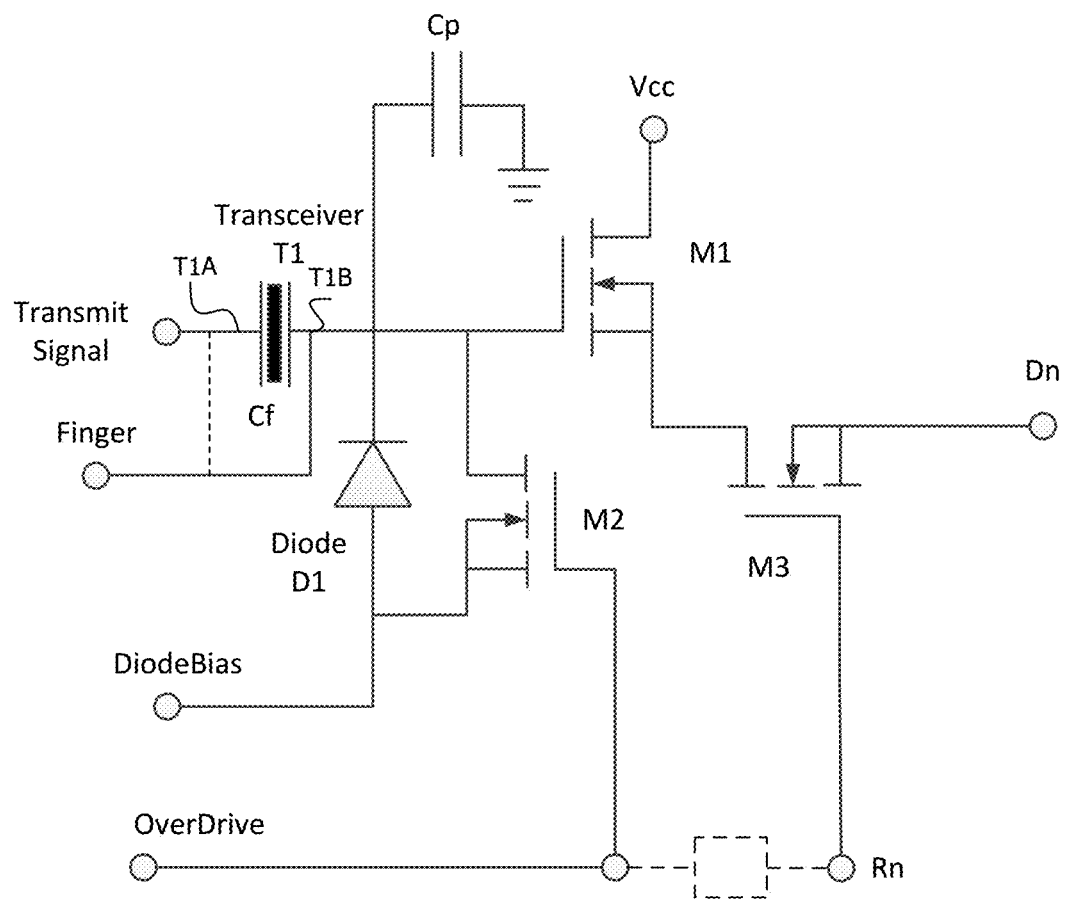
FIG. 9 illustrates an example pixel circuit of an ultrasonic sensor.

FIG. 9 illustrates an example pixel circuit 900 of an ultrasonic sensor using a single transceiver. Pixel circuit 900 is similar to circuit 400 of FIG. 4 and includes the same diode D1 and transistors M1-M3 as in FIG. 4. Pixel circuit 900 includes a single transceiver T1. One electrode T1A (excitation electrode) of transceiver T1 may be connected to a tone-burst generator to receive tone bursts for exciting the transducer of the transceiver to generate the transmission signal. Transceiver T1 may have a parasitic capacitance of $C_f$. A second electrode T1B of transceiver T1 may be connected to the cathode of diode D1, the gate of transistor M1, and the drain of transistor M2. The node where second electrode T1B of transceiver T1 is connected to diode D1 and transistors M1 and M2 may have a parasitic capacitance $C_p$. The anode of diode D1 may be connected to a DiodeBias signal. The drain of transistor M1 may be connected to a supply voltage Vcc, and the source of transistor M1 may be connected to the drain of transistor M3. The source of transistor M2 may be connected to the DiodeBias signal as well, and the gate of transistor M2 may be connected to an Overdrive signal. The gate of transistor M3 may be connected to a pixel selection signal Rn, which, in some implementations, may be derived from the Overdrive signal. The source of M3 may be connected to output Dn of pixel circuit 900. Fingers may be put on either side of the transceiver, depending on the specific structure of the ultrasonic sensor as described above.

Figure 10:
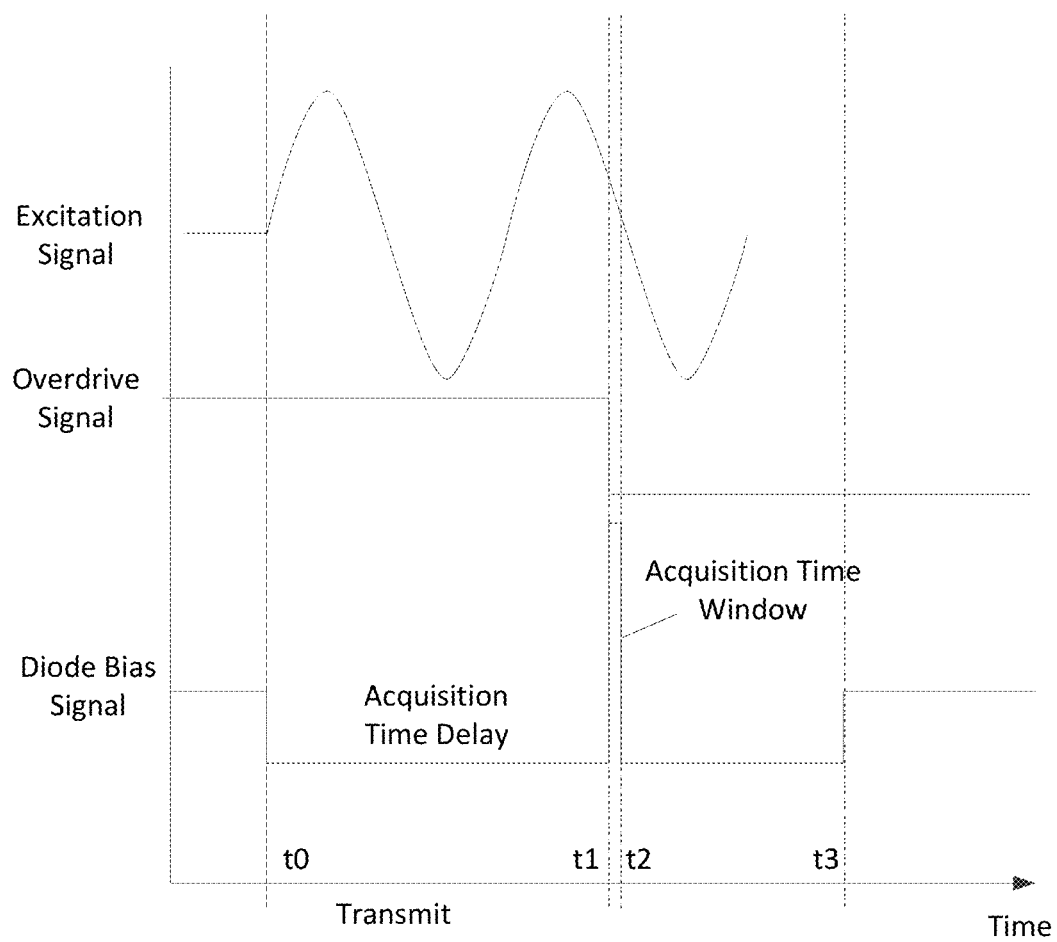
FIG. 10 illustrates an example timing diagram of signals for controlling a pixel circuit of an ultrasonic sensor.

FIG. 10 illustrates an example timing diagram of signals for controlling a pixel circuit of an ultrasonic sensor, such as pixel circuit 900 of FIG. 9. At time t0, the overdrive signal goes high, the DiodeBias signal goes low (0 Volt), and the excitation signal is applied to excitation electrode T1A of transceiver T1. As a result, transistor M2 is turned on by the overdrive signal, and second electrode T1B is set to a level approximately equal to the low level of DiodeBias signal, for example, close to 0 Volt. Thus, the excitation signal is applied across the transduce of transceiver T1 to generate ultrasonic pulses.

After an acquisition time delay, the Overdrive signal goes low and the DiodeBias signal goes high at time t1. As a result, transistor M2 is turned off, and the voltage generated by the piezoelectric material in the transceiver caused by the ultrasonic standing wave signal may be peak detected by diode D1 and stored on parasitic capacitance Cp at the gate of transistor M1 as described above with respect to FIG. 4.

After the acquisition time window, the DiodeBias signal may go back to a low level at time t2 to stop sampling the voltage generated by the piezoelectric material, and the Overdrive signal is kept at a low level (M2 remains off) to hold the voltage on parasitic capacitance Cp. The voltage on parasitic capacitance Cp may then be read out at output Dn by a pixel selection signal Rn to turn on transistor M3. As described above with respect to FIG. 4, transistor M1 may be a source follower transistor, i.e., a common-drain amplifier, and therefore the resulting voltage at output Dn may be approximately equal to the voltage at the gate of transistor M1 minus a gate threshold voltage. The resulting voltage read from the pixel circuit may then be digitized and processed to generate an image of the fingers as described above.

At time t3, the DiodeBias signal goes high, and the voltage at the gate of transistor M1 may be reset to a level approximately equal to the DiodeBias signal minus the voltage drop across diode D1.

Figure 11:
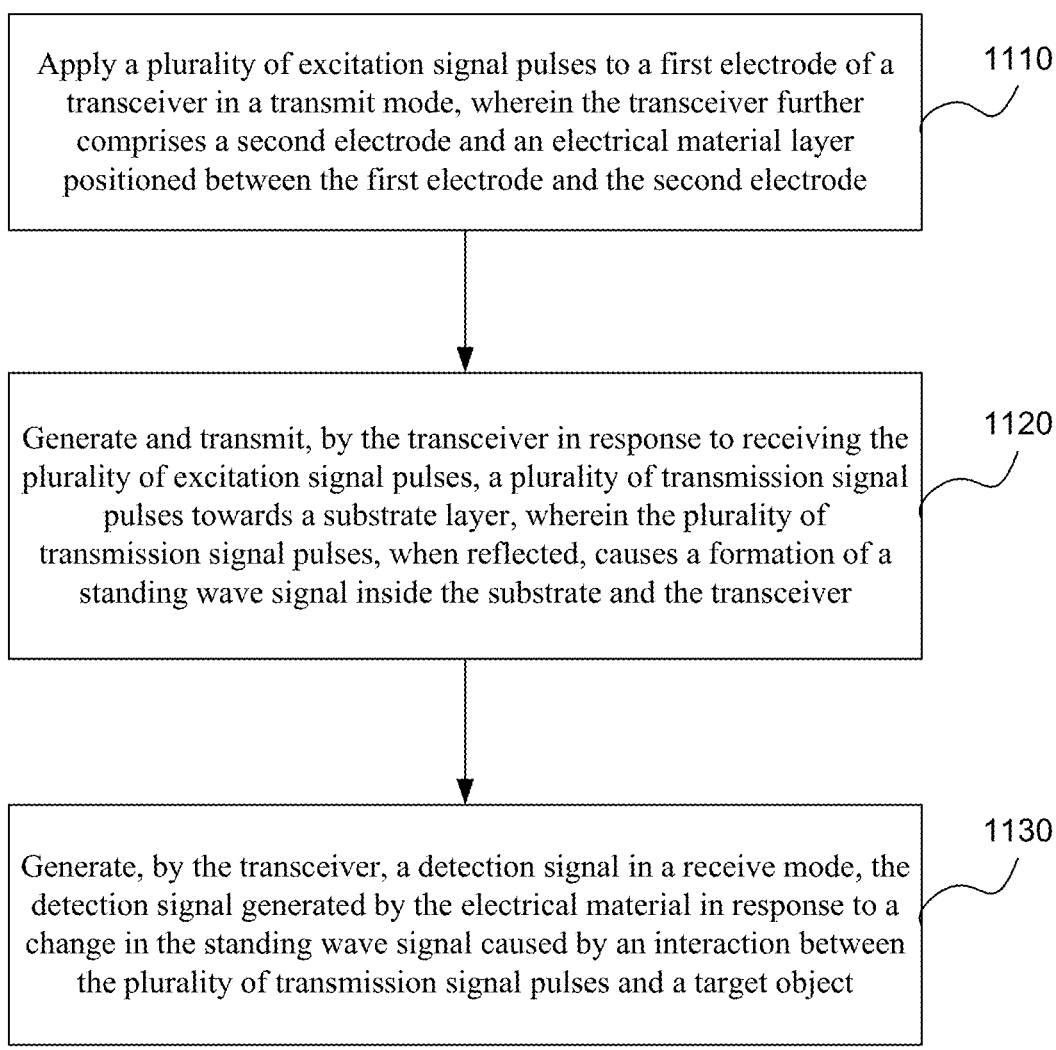
FIG. 11 is a flow chart illustrating an embodiment of a method for generating an image of a target object.

FIG. 11 is a flow chart illustrating an embodiment of a method for reading fingerprints of a user using an ultrasonic sensor having a single transceiver. It is noted that even though FIG. 11 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

At block 1110, a plurality of excitation signal pulses may be applied to a first electrode of a transceiver in a transmit mode, where the transceiver may also include a second electrode and an electrical material layer positioned between the first electrode and the second electrode. In an ultrasonic sensor, the electrical material layer may include a piezoelectric material, such as PVDF or TrFE-PVDF. The excitation signal pulses may be generated by a control unit and/or a tone-burst generator controlled by the control unit. As described above, the frequency and waveform of the excitation signal pulses may be selected based on the set of materials and thicknesses of the transceiver. In some embodiments, means for performing the function at block 1110 may include, but are not limited to, for example, control unit 310 and transmitter driver 314 of FIG. 3, transceiver 630 of FIGS. 6A-6C, transceiver 710 and tone-burst generator 750 of FIG. 7, transceiver T1 of FIG. 8, and mobile device 1200 as illustrated in FIG. 12 and described in detail below.

At block 1120, the transceiver may generate and transmit a plurality of transmission signal pulses towards a substrate layer in response to receiving the plurality of excitation signal pulses. For example, when the excitation signal pulses are applied to a piezoelectric material, such as PVDF or TrFE-PVDF, ultrasonic wave signals may be generated by the piezoelectric material. By selecting the frequency and waveform of the excitation signal pulses based on the set of materials and thicknesses of the transceiver, the plurality of transmission signal pulses, when reflected at the interfaces between layers of different materials, may cause the formation of a standing wave signal inside the substrate and the transceiver as described above. In some embodiments, means for performing the function at block 1120 may include, but are not limited to, for example, transceiver 630 of FIGS. 6A-6C, transceiver 710 of FIG. 7, and transceiver T1 of FIG. 8.

At block 1130, the transceiver may generate a detection signal in a receive mode based on a change in the standing wave signal caused by an interaction between the plurality of transmission signal pulses and a target object, such as a finger of a user. The detection signal may be generated by the electrical material in response to the change in the standing wave signal caused by the interaction between the plurality of transmission signal pulses and a target object, such as the change in amplitude, frequency, phase of the standing wave signal, or any combination thereof. The detection signal may be read out and used for generating an image of the target object. In some embodiments, means for performing the function at block 1130 may include, but are not limited to, for example, transceiver 630 of FIGS. 6A-6C, transceiver 710 of FIG. 7, and transceiver T1 of FIG. 8.

Figure 12:
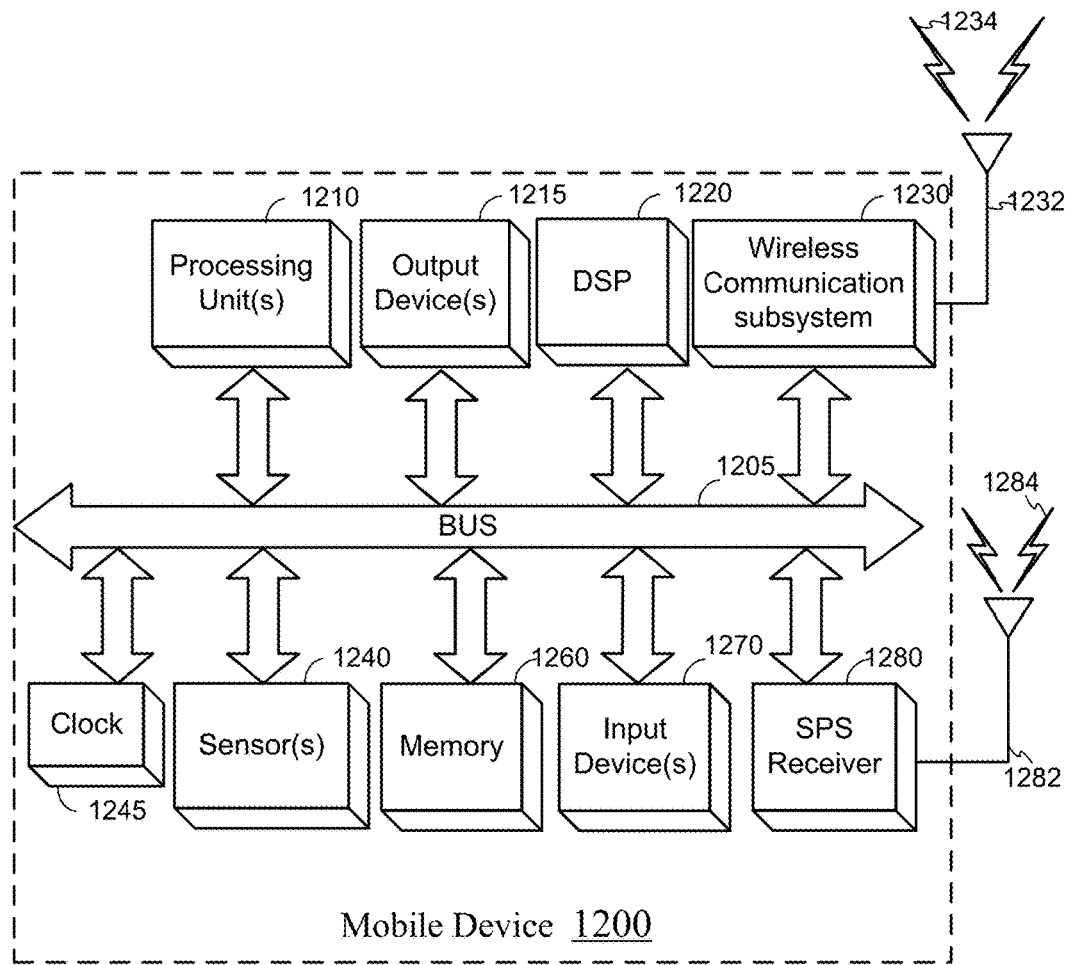
FIG. 12 is a block diagram of an example mobile device for implementing some of the examples described herein.

FIG. 12 is a block diagram of an example mobile device 1200 for implementing some of the examples described herein. For example, embodiments previously provided herein, such as ultrasonic sensors 100, 202, 300, and 600 described above, may be implemented in mobile device 1200 for biometric readings, such as fingerprint readings. It should be noted that FIG. 12 is meant only to provide a generalized illustration of various components, any or all of which may be utilized as appropriate. In some embodiments, for example, mobile device 1200 can be a cellular telephone or other mobile electronic device.

Mobile device 1200 is shown comprising hardware elements that can be electrically coupled via a bus 1205 (or may otherwise be in communication, as appropriate). The hardware elements may include processing unit(s) 1210 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 12, some embodiments may have a separate DSP 1220, depending on desired functionality. Mobile device 1200 also can include one or more input devices 1270, which can include without limitation a touch screen, a touch pad, microphone, button(s), dial(s), switch(es), and/or the like; and one or more output devices 1215, which can include without limitation a display, light emitting diodes (LEDs), speakers, and/or the like.

Mobile device 1200 might also include a wireless communication subsystem 1230, which can include without limitation a modem, a network card, an infrared communication device, a wireless communication device, and/or a chipset (such as a Bluetooth device, an IEEE 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1230 may permit data to be exchanged with a network, wireless access points, other computer systems, and/or any other electronic devices described herein, such as the configuration of FIG. 1. The communication can be carried out via one or more wireless communication antenna(s) 1232 that send and/or receive wireless signals 1234.

Depending on desired functionality, wireless communication subsystem 1230 can include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technologies (RATs). An OFDMA network may employ Long-Term Evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Mobile device 1200 may include a clock 1245 on bus 1205, which can generate a signal to synchronize various components on bus 1205. Clock 1245 may include an inductor-capacitor (LC) oscillator, a crystal oscillator, a ring oscillator, a digital clock generator such as a clock divider or clock multiplexer, a phase locked loop, or other clock generator. Clock 1245 may be synchronized (or substantially synchronized) with corresponding clocks on other wireless devices. Clock 1245 may be driven by wireless communication subsystem 1230, which may be used to synchronize clock 1245 of mobile device 1200 to one or more other devices. Clock 1245 may be used for controlling the operation of the electronic circuits of the ultrasonic sensor according to embodiments of this disclosure.

Mobile device 1200 can further include sensor(s) 1240. Such sensors can include, without limitation, one or more accelerometer(s), gyroscope(s), camera(s), magnetometer(s), altimeter(s), microphone(s), proximity sensor(s), light sensor(s), and the like. Some or all of sensor(s) 1240 can be utilized, among other things, for dead reckoning and/or other positioning methods. Such positioning methods may be used to determine a location of mobile device 1200. Sensor(s) 1240 may include an ultrasonic sensor according to certain embodiments of this disclosure.

Embodiments of the mobile device may also include a Standard Positioning Service (SPS) receiver 1280 capable of receiving signals 1284 from one or more SPS satellites using an SPS antenna 1282. SPS receiver 1280 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 1280 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Mobile device 1200 may further include and/or be in communication with a memory 1260. Memory 1260 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Memory 1260 of mobile device 1200 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIG. 12 might be implemented as code and/or instructions executable by mobile device 1200, a processing unit within mobile device 1200, and/or another device of a wireless system. In an aspect, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A sensor comprising:
    a substrate; and
    a transceiver coupled to a first side of the substrate, wherein the transceiver comprises:
        a single pair of electrodes including a first electrode and a second electrode, and
        a layer of electrical material positioned between the first electrode and the second electrode;
    wherein the transceiver is configured to, in response to receiving a plurality of excitation signal pulses on the first electrode, generate a plurality of transmission signal pulses for transmitting towards the substrate in a transmit mode, the plurality of transmission signal pulses, when reflected, causing a formation of a standing wave signal inside the substrate and the transceiver; and
    wherein the transceiver is further configured to generate a detection signal in a receive mode, the detection signal generated by the layer of electrical material in response to a change in the standing wave signal caused by an interaction between the plurality of transmission signal pulses and a target object.

2. The sensor of claim 1, wherein:
    the plurality of transmission signal pulses comprises a plurality of ultrasonic pulses; and
    the electrical material comprises a piezoelectric material.

3. The sensor of claim 2, wherein the piezoelectric material comprises at least one of a polyvinylidene difluoride (PVDF) material, a trifluoroethylene PVDF (TrFE-PVDF) material, a piezoelectric micro-machined ultrasonic transducer (PMUT), or a lead zirconate titanate (PZT) material.

4. The sensor of claim 1, further comprising:
    a cover coupled to a second side of the substrate opposite to the transceiver.

5. The sensor of claim 4, wherein the cover comprises a cover glass or a protective film.

6. The sensor of claim 1, further comprising a control unit configured to switch the transceiver between the transmit mode and the receive mode.

7. The sensor of claim 6, wherein the control unit is configured to connect, using a switch, the second electrode to a bias voltage in the transmit mode, or to a receiving circuit in the receive mode.

8. The sensor of claim 7, wherein the switch comprises one or more n-channel metal-oxide-semiconductor field-effect transistor switches.

9. The sensor of claim 7, wherein the bias voltage is zero volt.

10. The sensor of claim 7, wherein the second electrode, the switch, and the receiving circuit are formed on the substrate.

11. The sensor of claim 7, wherein the receiving circuit is configured to receive, store, and output the detection signal.

12. The sensor of claim 1, further comprising a plurality of receiver pixels formed on the substrate, wherein each of the plurality of receiver pixels is configured to be controlled individually to read out the detection signal generated by the transceiver at each of the plurality of receiver pixels.

13. The sensor of claim 1, wherein the substrate comprises a thin-film transistor (TFT) substrate or a silicon substrate.

14. The sensor of claim 13, wherein the second electrode is formed on the TFT substrate or the silicon substrate.

15. The sensor of claim 1, wherein the change in the standing wave signal comprises a change in at least one of an amplitude, a frequency, or a phase of the standing wave signal.

16. The sensor of claim 1, wherein the plurality of transmission signal pulses comprises a plurality of infrared optical pulses.

17. A method for generating an image of a target object, the method comprising:
    applying a plurality of excitation signal pulses to a first electrode of a transceiver in a transmit mode, wherein the transceiver comprises:
        a single pair of electrodes including the first electrode and a second electrode; and
        an electrical material layer positioned between the first electrode and the second electrode;
    generating and transmitting, by the transceiver in response to receiving the plurality of excitation signal pulses, a plurality of transmission signal pulses towards a substrate, wherein the plurality of transmission signal pulses, when reflected, causes a formation of a standing wave signal inside the substrate and the transceiver; and
    generating, by the transceiver, a detection signal in a receive mode, the detection signal generated by the electrical material layer of the transceiver in response to a change in the standing wave signal caused by an interaction between the plurality of transmission signal pulses and the target object.

18. The method of claim 17, further comprising:
connecting, by a switch, the second electrode of the transceiver to a bias voltage in the transmit mode or to a receiving circuit in the receive mode.

19. The method of claim 18, wherein the switch comprises one or more n-channel metal-oxide-semiconductor field-effect transistor switches.

20. The method of claim 18, further comprising:
reading out, via the receiving circuit, the detection signal generated by the transceiver; and
generating the image of the target object based on the detection signal.

21. The method of claim 18, wherein the switch, the second electrode, and the receiving circuit are formed on the substrate.

22. The method of claim 17, wherein:
the plurality of transmission signal pulses comprises a plurality of ultrasonic pulses; and
the electrical material layer comprises a piezoelectric material.

23. The method of claim 17, wherein the substrate comprises a thin-film transistor (TFT) substrate or a silicon substrate.

24. The method of claim 17, wherein the change in the standing wave signal comprises a change in at least one of an amplitude, a frequency, or a phase of the standing wave signal.

25. An apparatus comprising:
means for applying a plurality of excitation signal pulses to a first electrode of a transceiver in a transmit mode, wherein the transceiver comprises:
a single pair of electrodes including the first electrode and a second electrode; and
an electrical material layer positioned between the first electrode and the second electrode;
means for generating and transmitting a plurality of transmission signal pulses towards a substrate in response to receiving the plurality of excitation signal pulses, wherein the plurality of transmission signal pulses, when reflected, causes a formation of a standing wave signal inside the substrate and the transceiver; and
means for generating a detection signal in a receive mode, in response to a change in the standing wave signal caused by an interaction between the plurality of transmission signal pulses and a target object.

26. The apparatus of claim 25, further comprising:
means for connecting the second electrode of the transceiver to a bias voltage in the transmit mode or to a receiving circuit in the receive mode.

27. The apparatus of claim 25, further comprising:
means for reading out the detection signal.

28. The apparatus of claim 25, wherein
the plurality of transmission signal pulses comprises a plurality of ultrasonic pulses; and
the electrical material layer comprises a piezoelectric material.

29. A non-transitory computer-readable storage medium comprising machine-readable instructions stored thereon, the instructions, when executed by one or more processing units, causing the one or more processing units to:
connect, via a switch, a first electrode of a transceiver to a bias voltage in a transmit mode, wherein the transceiver comprises:
a single pair of electrodes including the first electrode and a second electrode; and
an electrical material layer positioned between the first electrode and the second electrode;
apply a plurality of excitation signal pulses to the second electrode of the transceiver in the transmit mode, wherein the transceiver is configured to generate and transmit a plurality of transmission signal pulses towards a substrate in response to receiving the plurality of excitation signal pulses, the plurality of transmission signal pulses, when reflected, causing a formation of a standing wave signal inside the substrate and the transceiver;
connect, via the switch, the first electrode of the transceiver to a receiving circuit in a receive mode; and
control, in the receive mode, the transceiver and the receiving circuit to generate and store a detection signal associated with a change in the standing wave signal caused by an interaction between the plurality of transmission signal pulses and a target object.

30. The non-transitory computer-readable storage medium of claim 29, wherein the instructions, when executed by the one or more processing units, further cause the one or more processing units to:
control the receiving circuit to read the stored detection signal; and
generate an image of the target object based on the detection signal.

* * * * *